April 22, 1969  W. K. H. FRANK ET AL  3,439,792
CONTAINER ORIENTER
Filed July 19, 1967  Sheet 1 of 2

INVENTORS
WALTER K. H. FRANK
RAY B. PACKER
By Joseph P. O'Halloran
Agent

INVENTORS
WALTER K. H. FRANK
RAY B. PACKER
By Joseph P. O'Halloran
Agent

United States Patent Office 3,439,792
Patented Apr. 22, 1969

3,439,792
CONTAINER ORIENTER
Walter K. H. Frank, Lombard, and Ray B. Packer, Cary,
Ill., assignors to The Quaker Oats Company, Chicago,
Ill., a corporation of New Jersey
Filed July 19, 1967, Ser. No. 654,443
Int. Cl. B65g 47/24
U.S. Cl. 198—33                                    4 Claims

ABSTRACT OF THE DISCLOSURE

An apparatus for orienting containers in a uniform direction while moving on a conveyor. A rotatable disk and a pressure plate spaced such that an extending neck portion of a container passing through the space is caused to rotate, and a stop to engage an extending portion of the container and stop the rotation of the container when the extending portion of the container has reached a specified direction.

Background of the invention

This invention relates to an apparatus for orienting containers in a uniform direction on a conveyor. The containers to be oriented must have a circular neck portion extending above the remainder of the container and an extending body portion which extends along a horizontal plane a distance substantially greater than the greatest distance along the horizontal plane to any other portion of the container.

Heretofore, many container orienters have been devised for use in aligning or arranging containers in some set pattern on a conveyor. Most of these devices use a complex mechanical system that either transfers the container to a rotating platform or else rotates the container by engaging an index in the container. Other of the known container orienters use a clamping or gripping device to force the container into a mold or guide and if the container is properly designed its shape then guides it into the mold in a specified direction. In any of these cases either a complex mechanical system is required or else critical design of the container is required. Regardless of which approach is used, the system is not readily converted to various shapes and sizes of containers. Prior known apparatus, therefore, have failed to accomplish what we have accomplished by this invention.

Summary of the invention

It is an object of this invention to provide a simple, reliable apparatus for orienting containers on a conveyor.

The object of this invention is accomplished by an apparatus that imparts a rotational motion to the containers as they move along a conveyor and then stops the containers when an extending portion is in a predetermined direction.

More particularly, the object of this invention is accomplished by having containers pass along a conveyor and then be contacted by a rotating wheel and a pressure plate. The rotating wheel and pressure plate rotate the containers until they are in substantially the direction desired, at which point they are stopped in their rotation by a stop. In a preferred embodiment, for use with oval-shaped containers, a set of guides then aligns the containers to a completely uniform direction. This object, as well as other objects of this invention, may be more readily seen in view of the disclosure in the accompanying drawings.

Brief description of the drawings

The objects of this invention are more fully explained by the claims and further illustrated by the accompanying drawings wherein:

Figure 1:
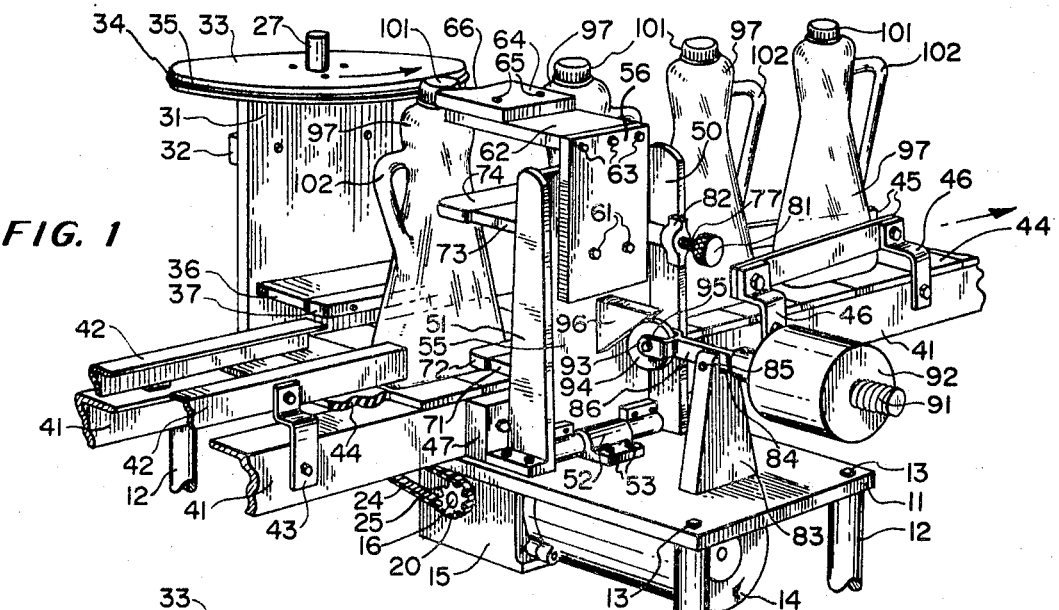
FIGURE 1 is a perspective view of the container orienter showing containers moving through the orienter.

On the accompanying drawings we have used the reference numeral 11 to refer to a base plate. The base plate is supported by legs 12 which are attached to the base plate 11 by bolts 13. An electric motor 14 is attached to the underside of the base plate 11. A gear box 15 is attached to the underneath side of the base plate 11 and operatively attached to the output end of the motor 14. The output of the gear box 15 is through shaft 16. A sprocket 20 is attached to the shaft 16. A second gear box 21 is attached to the underside of the base plate 11. The second gear box 21 receives its power through an input shaft 22. Attached to the input shaft 22 is a second sprocket 23. A chain 24 is directed around the sprockets 20 and 23 and engages in the sprocket teeth 25 and 26 to turn the sprocket 23. The output of gear box 21 is through a vertical shaft 27 which extends through a hole in the base plate 11 and extends upwards along a vertical plate 31 which is affixed to the base plate 11. The vertical shaft 27 is attached to the vertical plate 31 by a bearing 32. A circular disk 33 is attached to the upper portion of the vertical shaft 27. The circular disk 33 has a groove 34 around its circumference. An O-ring 35 is firmly fitted in the groove 34.

A horizontal guide 36 is attached to the vertical plate 31. A soft material 37 is attached to the horizontal guide 36 in order to provide cushioning for the containers.

The containers are conveyed by a conveyor to the orienter. A conveyor track 41 is attached to the base plate 11 on the top side of the base plate. A pair of guiding arms 42 are attached to the conveyor track 41 through supports 43. In order to provide a means for moving the containers against the circular disk, a substantially smooth conveyor belt 44 passes over the conveyor track 41. A second pair of guides 45 are attached to the conveyor track 41 through the attachments 46. A support 47 is attached to the base plate 11 and to the side of the conveyor track 41, keeping the orienting means of this invention immovably attached to the conveyor track. A pair of vertical supports 50 and 51 are attached to the top side of the base plate 11 and the side of the support 47. A hinge 52 is attached to the top side of the base plate 11 by bolts 53. The hinge 52 pivots about a hinge shaft 54 (see FIGURE 4). A hinged plate 55 is attached to the hinge 52. A plate 56 is firmly attached to the hinged plate 55 by the bolts 61. A horizontal plate 62 is firmly attached to the plate 56 by the bolts 63. A nylon horizontal pressure plate 64 is rigidly attached to the horizontal plate 62 by the screws 65. The horizontal pressure plate 64 may either have a curved edge 66 (see FIGURE 6) or a straight edge 67 (see FIGURE 7).

A horizontal guide 71 is rigidly attached to the vertical supports 50 and 51. A nylon piece 72 is rigidly attached to the end of the horizontal guide 71. In order to stop the containers after the desired rotation is completed, a removable stop 73 is rigidly attached to the vertical supports 50 and 51. A nylon piece 74 is firmly attached to the end of the removable stop 73.

Figure 4:
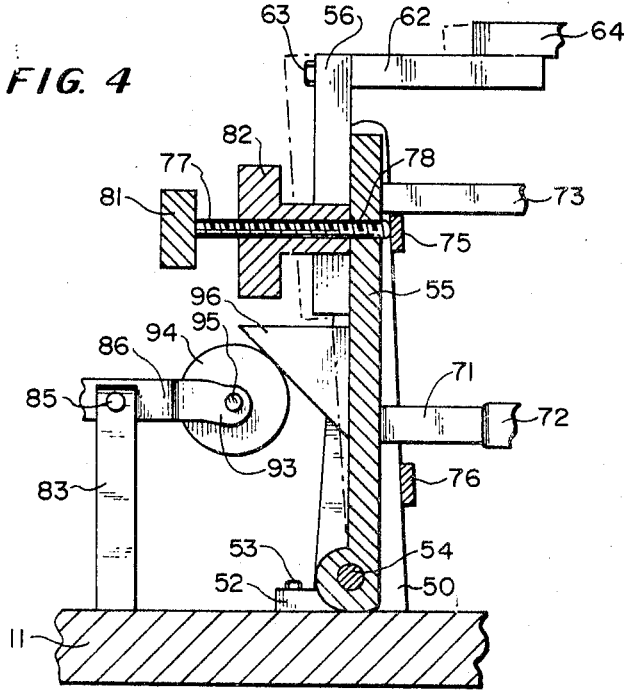
FIGURE 4 is an enlarged vertical section view along line 4—4 showing an adjustment device for spacing the pressure plate of the orienter.

The gap or space between the pressure plate 64 and the circular disk 33 is adjusted by a screw arrangement best illustrated in FIGURE 4. For this, a pair of horizontal connectors 75 and 76 connect the two vertical supports 50 and 51. An adjusting screw 77 extends through a threaded hole 78 in the movable hinged plate 55 and abuts on the immovable horizontal connecter 75. A knurled knob 81 is attached to the adjusting screw 77 at the end of the adjusting screw opposite the horizontal connector 75. A lock nut 82 is located on the adjusting screw 77 and contacts the hinged plate 55 to hold the adjusting screw 77 in place.

Figure 3:
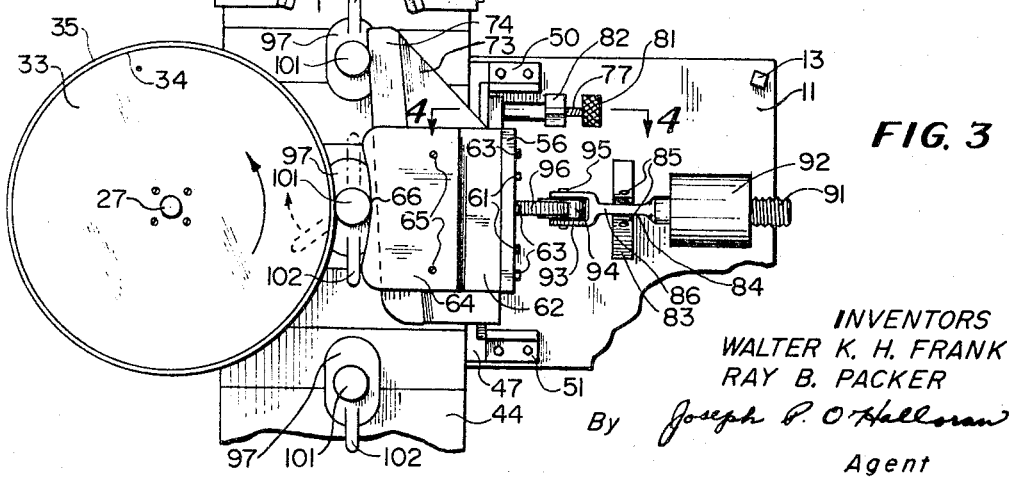
FIGURE 3 is a detailed top view of the container orienter showing the containers entering and leaving the orienter and being rotated while in the orienter.

In order to force the pressure plate toward the circular disk, a vertical stand 83 (see FIGURE 4) is rigidly attached to the top side of the base plate 11. The vertical stand 83 has a groove 84 (see FIGURE 3) in its top portion. A pin 85 extends through the groove 84 and connects to the vertical stand 83. A lever 86 is located in the groove 84 and pivots on the pin 85. A first end 91 of the lever 86 is threaded. A movable weight 92 screws onto the lever 86 on its threaded end 91. The lever 86 has attached at its end opposite the threaded end a fork 93. A wheel 94 is rotatably attached inside the fork 93 by the axle 95. A triangular plate 96 is rigidly attached to the hinged plate 55 in such a location as to be contacted by the wheel 94 as illustrated.

Figure 5:
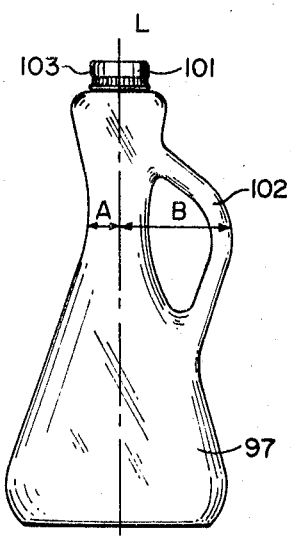
FIGURE 5 is a side view of a typical container which may be oriented by the apparatus.

A typical container 97 (see FIGURE 5) which can be oriented by the apparatus is shown with its extending neck portion 101, cap 103 and a handle 102. The container 97 has an extending body portion, i.e. on the handle 102, which extends along a horizontal plane a distance B which is substantially greater than the greatest distance A along the same horizontal plane to any other portion of the container. By the term "substantially greater" we intend to mean that distance B be at least one inch greater than distance A, a construction which we have found operable in a container as shown in FIGURE 5. The vertical line L shown in FIGURE 5 represents a line around which the bottle 97 pivots as the bottle is turned by rotation of the neck portion 101 while the bottle is standing on a horizontal surface. This line is defined as a vertical line drawn through the center of the neck portion 101 or cap 103.

*Practical operation*

Figure 2:
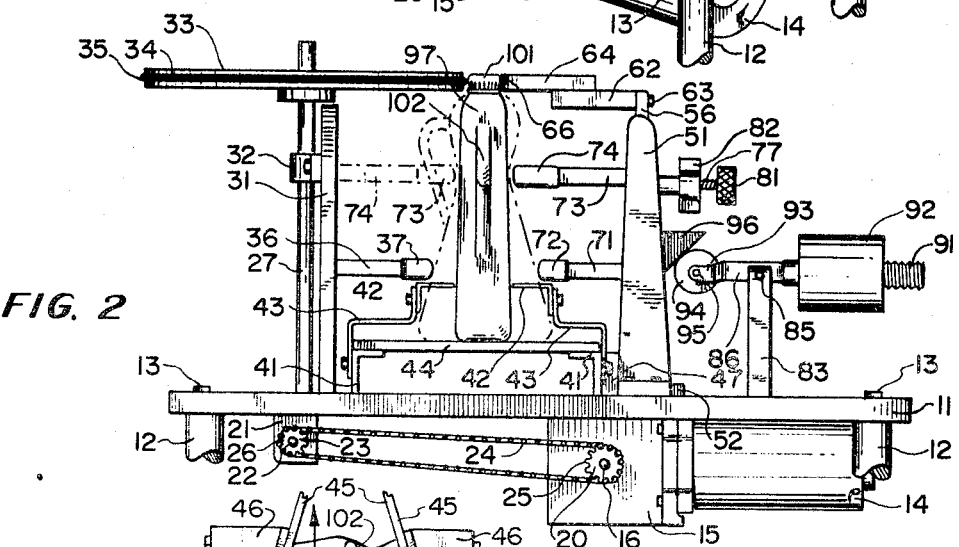
FIGURE 2 is a detailed end view of the container orienter showing the containers moving toward the orienter and being rotated by the orienter.

In operation of the container orienter the typical container 97 moves along the conveyor 44. The conveyor 44 should be a moving-platform-type conveyor such as the endless belt, plate top chain, table top chain, etc. It is essential that the containers be able to slide freely on the conveyor (e.g. that the conveyor contains no bottle engaging means such as lugs, or the like) so that they may be freely oriented to the desired position. In one commercial operation, filled and capped syrup bottles of the design shown in FIGURE 5 are discharged from a sterilizer (not shown, since it constitutes no part of this invention) onto the conveyor 44, in which case the handles 102 of the containers 97 are randomly arranged to the front and rear of the containers 97. It is imperative that the bottles be oriented on the conveyor with handles all to the front or to the rear prior to feeding of the bottles into a labeling machine (which also is not shown since it constitutes no part of this invention). Such is the function of the apparatus of this invention. The guides 42 are located above the conveyor 44 and are spaced at a distance sufficient to substantially align the randomly oriented containers 97 so that the handles 102 are either in the direct front or direct rear of the containers 97 with respect to the line of travel on the conveyor. The guides 42 are also positioned so that when the containers pass out from between the guides 42 the extending neck portion 101 and specifically, in this illustration, the cap 103 of the container comes between the pressure plate 64 and the O-ring 35 which is attached to the circular disk 33. Horizontal guides 36 and 71 are properly located so that the relatively soft nylon pieces 37 and 72 prevent the containers from overturning during rotation. These guides 36 and 71 are spaced apart to permit free rotation of container 97 between them (see FIGURE 2) but to restrict tipping laterally.

The circular disk 33 and O-ring 35 are rotated by the vertical shaft 27 which is turned by the gear box 21. The gear box 21 receives its energy through the sprocket 23 which in turn receives its energy through the chain 24, which encircles the sprocket 20. The sprocket 20 receives its motion through the shaft 16 which is the output of gear box 15. Gear box 15 in turn receives its energy from motor 14 which it attached to the underneath portion of base 11.

The O-ring 35 and the pressure plate 64 are adjusted so that the distance between the O-ring 35 and the pressure-applying edge 66 or 67 is approximately equal to, but slightly less than, the diameter of the extending neck portion 101 of the containers 97. The pressure plate 64 is rigidly attached to the plate 62 which in turn is attached to the hinged plate 55 through the plate 56. The hinged plate 55 is pivotably attached to the base 11 by the hinges 52.

The rotating disk and the pressure plate must contact the neck portion of the container in order to impart rotational motion to the container. Since the circular disk does not move horizontally, all spacing between the pressure plate and rotating disk, as well as pressure exerted on the container passing through the space between them, must be adjusted by way of the pressure plate. The source of the horizontal pressure at the pressure plate is the downward gravitational force on weight 92 which is transformed into an upward force at the wheel 94 against triangular plate 96. Since the triangular plate 96 is rigidly attached to the hinged plate 55 which supports the pressure plate elements 62 and 64, the upward force on the bottom of the triangular plate 96 is transformed into a substantially horizontal force at the pressure plate 64. To adjust the horizontal force exerted at the pressure plate 64, the weight 92 is turned to move it farther away from pivot pin 85 to increase the horizontal force at 66, or the weight 92 is turned to move it closer to pin 85 to decrease this force. In order to insure the proper spacing between the circular disk and the pressure plate, the adjusting screw 77 is screwed or threaded through the hinged plate 55 and is locked in place by the lock nut 82 (see FIGURE 4). Hence, this adjustment screw 77 abuts on the connecting piece 75 to adjust the distance between the pressure edge 66 or 67 of the pressure plate 64 and the O-ring 35. Hence, after discharge of the bottle, it is the connecting piece 75 which actually stops the closing motion of the pressure-applying mechanism and keeps the pressure-applying surface 66 or 67 spaced apart from the rotating disk 33 and O-ring 35 to permit easy entry of the next bottle between the pressure plate and the disk. The distance is adjusted so that the extending container portion 101 is firmly gripped between the pressure edge 66 of the pressure plate 64 and the O-ring 35, and the rotation of the circular disk imparts a rotational force to the container by contacting the extending container portion 101.

The circular disk must have a diameter large enough that the container can freely turn without contacting any of the supporting connections of the shaft. In the case of the typical container that is shown, this would require that the circular disk diameter be at least four times the diameter of the extending neck portion of the container.

If it is desired to have the handles of the containers in the front portion of the container as it leaves the orienting device, the stop 73 is attached to the vertical plate 51 at a height where it will contact the handle 102 of the container 97 as it rotates. If the handle is in the front portion of the container when the container is engaged by the O-ring and pressure plate, the stop will engage the handle and not allow the container to rotate. If the handle is in the rear portion of the container and is desired to be in the front portion after leaving the orienting device, the O-ring and pressure plate will rotate the container until the handle contacts with stop 73. The containers will then all be aligned with their handles substantially in front of them with respect to their line of motion on the conveyor. Any remaining alignment required to have the handles exactly in front of the containers is optionally accomplished by the guides 45 which align the containers in a straight line on the conveyor.

On the other hand, if it is desired to have all the handles of the containers at the rear of the containers as they leave the orienting device, the stop 73 is attached to the vertical plate 31 at the same height as if it were attached to the vertical support 51. When a container then moves into the orienting device with its handle in the rear position, the stop prevents rotation of the container and allows it to leave the device with its handle in the rear position. When the container moves into the orienting device with its handle in the front position, the circular disk and pressure plate impart a rotation to the container and rotate it until the handle contacts the stop, at which time the handle will be in the rear position. Again, any additional alignment on the conveyor is accomplished by the guides 45.

It must be realized at this point that the tangential velocity of the circular disk at the point at which it contacts the container must be in substantially the direction of the velocity of the containers on the conveyor. Otherwise a rearward force imparted to the extending neck portion of the container would create a torque in the container which would tend to cause it to topple on the conveyor.

Since the guides 45 can be used to complete the alignment of the containers that have not been fully oriented, the rotating apparatus need only orient the containers so that they are substantially in a uniform direction. For this, the tangential velocity of the circular disk need only be from ½ to 1½ times the selected velocity of the containers on the conveyor. This will cause all the handles of the containers to be either in the front or rear of the container, as desired, depending on whether the stop 73, 74 is on the right or left of the container, and the handles will be within a small angle, e.g. at 45° angle, from perfect alignment on the conveyor. If the containers are oblong in shape and are this near alignment, the optional guides 45 can completely align them in a straight line with the handles in the desired direction, i.e. directly in front or rear. Also, in order for the containers to be substantially aligned before entering the guides 45, the contact edge of the pressure plate must have a length sufficient to cause the containers to rotate one-half turn, e.g. at least ⅜ times the circumference of the part of the container contacted by the pressure plate. This again rotates the container to the degree necessary in order for the guides to effect exact alignment.

Figure 6:
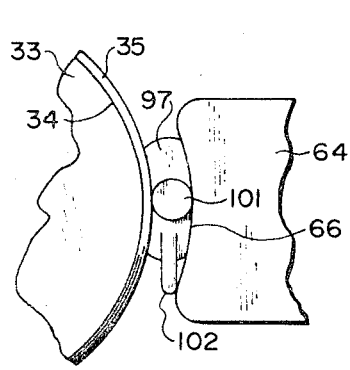
FIGURE 6 is a top view showing the relationship between the rotating device and the pressure plate.
Figure 7:
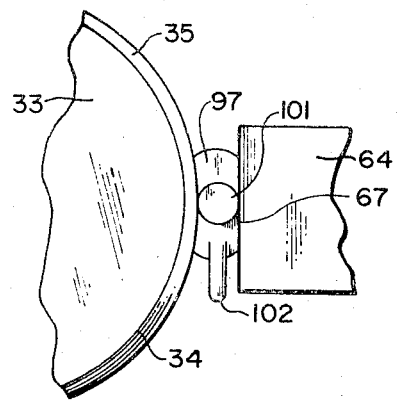
FIGURE 7 is a top view showing an alternate design for the pressure plate.

The pressure plate can have a varied construction. One construction is as shown in FIGURE 6 wherein the pressure-applying edge 67 is concentric to the circular disk. This design results in the maximum contact of the pressure-applying edge with the minimum horizontal movement of the pressure plate and is the preferred construction. The pressure plate, such as is shown in FIGURE 7, can also have a straight pressure-applying edge 67, but this requires that the pressure plate have a greater horizontal movement in effecting the same contact area on the container. It may be understood that any means such as a second rotating disk may be substituted for the pressure plate as long as the relative difference in speed between the means and the circular disk 33 is the same as hereinbefore described between the circular disk 33 and a stationary pressure plate 64.

This apparatus has proved to be very simple to adjust and maintain while still performing in an outstanding manner as a container orienter. Another advantage of this machine is that the O-ring and pressure plate may both be easily and quickly replaced if wear becomes apparent. The stop and the guides can easily be relocated to effect orientation of containers having different configurations as long as the container has a circular neck portion extending above the remainder of the container, a pivot line extending vertically through the center of the central neck portion of the container, and an extending container body portion which extends along a horizontal plane a distance substantially greater than the greatest distance along the horizontal plane to any other portion of the container. The guides 36 and 71 and the stop 73 can be appropriately and easily relocated by one with ordinary skill and containers having the above-mentioned design can be effectively aligned by the orienter. The distance between the pressure-applying edge of the pressure plate and the O-ring can be easily adjusted for containers having different neck or cap diameters by the adjustment screw 77 which can in turn be locked in place by the lock nut 42.

Thus, we have invented a simple but extremely reliable article orienting device which very easily orients articles and is readily adaptable to a wide variation of article shapes. As such, our orienter provides a unique machine which significantly advances and improves the art of article orientation, particularly container orientation.

Therefore, we claim:

1. An apparatus for orienting articles moving in a line on a moving-platform-type conveyor, said articles having a substantially round neck portion situated above all the other structure of the article, a vertical rotation line through the center of said neck portion, and an extended lateral structure extending substantially further from said rotational line than any other structure at any side of the article in the same horizontal plane, said apparatus comprising: a horizontal driven wheel; shoe means for keeping the neck portion of the article pressed against the circumference of the driven wheel, said shoe means being located opposite the edge of the wheel and spaced apart therefrom forming a gap therebetween, said gap being wide enough to permit entry of the neck portion therein, said wheel and opposite shoe means being situated so that the gap therebetween is in the path of the neck portion of the articles moving on the conveyor, and so that the tangents of the wheel within the gap are in substantially the same direction as the path of travel of the articles moving on the conveyor; and a rotation stop-skid means for arresting the rotational motion of the article, said rotation stop-skid means being situated adjacent to the path of the articles and closely enough thereto to arrest the rotational motion of the article moving in said path upon being struck by said lateral structure of the article, said skid means extending adjacent to the path until the article is beyond said gap; and means for driving the wheel in a direction such that the tangential velocity within the gap is in substantially the same direction as the velocity of the container; whereby an article moving on the conveyor enters the gap between the wheel and opposite shoe, is subjected to a rotational force due to the rotation of the wheel, and is rotated until an extended lateral structure on the article strikes the skid situated parallel to the path of the article, and all the articles are discharged from said gap with said extended lateral structures oriented in substantially the same direction.

2. In a container orienting device for attaching adjacent to a conveyor and orienting containers in a uniform direction while moving at a selected velocity in a line along a path on the conveyor containers having a circular neck portion extending above the remainder of the container, an outer neck edge extending around the circumference of the circular neck portion, a pivot line extending vertically through the center of the circular neck portion, and an extending container body portion which extends along a horizontal plane a distance from the pivot line substantially greater than the greatest distance along the horizontal plane from the pivot line to any other portion of the container, the combination comprising: a frame attached adjacent to the conveyor; a substantially horizontal circular disk having a center pivot point, a disk radius, and and outer disk edge, said circular disk being rotatably mounted to said frame at said center pivot point of said circular disk, and said outer disk edge extending over said conveyor and at all times during rotation intersecting the path of the containers at an intersection point at the circular neck portion of the containers, said disk radius being greater than four times the radius of the circular neck portion of the containers; a disk rotating means for rotating a circular disk about a center pivot point at a rotational speed wherein the linear tangential velocity of the outer edge of the circular disk is in the same direction as the velocity of the containers on the conveyor and is from ½ to 1½ times the selected velocity of the containers on the conveyor, said disk rotating means being attached to said circular disk; a guiding means for guiding the containers through the container orienting device, said guiding means being attached to said frame; a pressure-applying means, said pressure-applying means being pivotably attached to said frame at a point opposite said circular disk, a pressure plate having a pressure-applying edge, said pressure plate being attached to said pressure-applying means above said conveyor, and said pressure-applying edge having a length greater than ⅜ the circumference of the outer neck edge of the container, and said pressure-applying edge of said pressure-applying means at all times intersecting the path of said containers at the circular neck portion of the containers opposite the intersection point of the circular disk and the containers; a stopping means for stopping rotation of containers after they reach an approximately uniform direction on the conveyor, said stopping means being attached to said frame above said conveyor at a height equal to the height of the extending body portion of the container from the conveyor; an alignment means for uniformly aligning containers that have been significantly oriented toward a uniform direction, said alignment means being located above said conveyor past the point in movement of the conveyor at which the circular disk extends over the conveyor; wherein the containers move along the conveyor in a line in a non-uniform orientation, the circular disk and the pressure-applying edge of the pressure-applying means engage the circular neck portion of the containers and impart a rotational force to the containers, and the stopping means stops the containers in a uniform or nearly uniform orientation.

3. In a container orienting device for attaching adjacent to a conveyor and orienting containers in a uniform direction while moving at a selected velocity along a path on the conveyor, containers having a circular neck portion extending above the remainder of the container, an outer neck edge extending around the circumference of the circular neck portion, a pivot line extending vertically through the center of the circular neck portion, and an extending container body portion which extends along a horizontal plane a distance from the pivot line substantially greater than the greatest distance along the horizontal plane from the pivot line to any other portion of the container, the combination comprising: a frame attached adjacent to the conveyor; a vertical plate, said vertical plate attached to said frame adjacent to said conveyor; a circular disk having an outer disk edge, a disk radius, and a center pivot point, said circular disk being rotatably attached by its center pivot point to said vertical plate, and said disk radius being greater than four times the diameter of the circular neck portion of the container which extends above the remainder of the container on the conveyor, and said outer disk edge at all times extending over said conveyor and intersecting the path of the outer neck edge of the container as the container moves on the conveyor; a disk rotating means for rotating a circular disk at a rotational speed wherein the linear tangential velocity of the outer edge of the circular disk is in the same direction as the velocity of the containers on the conveyor and is substantially the same velocity and in the same direction as the selected velocity of the containers on the conveyor, said disk rotating means being attached to said circular disk; a guiding means for guiding containers into contact with the circular disk, said guiding means being attached to said frame and extending above said conveyor; a hinged plate, said hinged plate being pivotably attached to said frame; a pressure plate, said pressure plate having a pressure-applying edge, said pressure-applying edge being substantially concentric to said circular disk, and said pressure-applying edge having a length at least ⅜ times the circumference of the circular neck portion of the containers, said pressure plate being attached to said hinged plate above said conveyor, and said pressure-applying edge of said pressure plate at all times intersecting the path of the outer neck edge of the containers at a point opposite the point at which the circular disk intersects the outer neck edge of the containers; an adjustment means for adjusting the distance between the pressure plate and the circular disk, said adjustment means being attached to said hinged plate; a pressure-applying means for forcing the pressure plate toward the circular disk, said pressure-applying means being attached to said hinged plate; a stopping means for stopping rotation of containers, said stopping means being attached to said frame between said pressure plate and said conveyor at a height equal to the height of the extending body portion of the container above the conveyor; an alignment means for aligning significantly oriented containers in a uniform direction, said alignment means being attached above said conveyor past the point in movement of the conveyor at which the circular disk extends over the conveyor; wherein the containers move along the conveyor, the circular disk and the pressure plate contact the containers and impart a rotational motion to them, the stopping means stops the rotation of the containers in a substantially uniform direction and the alignment means orients the containers in a uniform direction.

4. In a container orienting device for attaching adjacent to a conveyor and orienting containers in a uniform direction while moving at a selected velocity along a path on the conveyor, said containers having a circular neck portion extending above the remainder of the container, an outer neck edge extending around the circumference of the circular neck portion, a pivot line extending around the circumference of the circular neck portion, a pivot line extending vertically through the center of the circular neck portion, and an extending container body portion which extends along a horizontal plane a distance from the pivot line substantially greater than the greatest distance along the horizontal plane from the pivot line to any other portion of the container, the combination comprising: a frame attached adjacent to the conveyor; a vertical plate, said vertical plate attached to said frame adjacent to said conveyor; a circular disk having an outer disk edge, a disk radius, and a center pivot point, said circular disk being rotatably attached by its center pivot point to said vertical plate, and said disk radius being greater than four times the diameter of the circular neck portion of the container which extends above the remainder of the container on the conveyor, and said outer disk edge at all times extending over said conveyor and intersecting the path of the outer edge of the container as the container moves on the conveyor; a disk rotating means for rotating a circular disk at a rotational speed wherein the linear tangential velocity of the outer edge of the circular disk is in the same direction as the velocity of the containers on the conveyor and is substantially the same velocity and in the same direction as the selected velocity of the containers on the conveyor, said disk rotating means being attached to said circular disk; a guiding means for guiding containers into contact with the circular disk, said guiding means being attached to said frame and extending above said conveyor; a hinged plate, said hinged plate being pivotably attached to said frame; a pressure plate, said pressure plate having a pressure-applying edge, said pressure-applying edge being substantially concentric to said circular disk, and said pressure-applying edge having a length at least ⅜ times the circumference of the circular neck portion of the containers, said pressure plate being attached to said hinged plate above said conveyor, and said pressure-applying edge of said pressure plate at all times intersecting the path of the outer neck edge of the containers at a point opposite the point at which the circular disk intersects the outer neck edge of the containers; an adjustment means for adjusting the distance between the pressure plate and the circular disk, said adjustment means being attached to said hinged plate; a pressure-applying means for forcing the pressure plate toward the circular disk, said pressure-applying means being attached to said hinged plate; a stopping means for stopping rotation of containers, said stopping means being attached to said vertical plate between said circular disk and said conveyor at a height equal to the height of the extending body portion of the containers above the conveyor; and alignment means for aligning significantly oriented containers in a uniform direction, said alignment means being attached above said conveyor past the point of movement of the conveyor at which the circular disk extends over the conveyor; wherein the containers move along the conveyor, the circular disk and the pressure plate contact the containers and impart a rotational motion to them, the stopping means stops the rotation of the containers in a substantially uniform direction and the alignment means further orients the containers in a uniform direction.

References Cited

UNITED STATES PATENTS 2,222,504   11/1940   Essen.

EDWARD A. SROKA, *Primary Examiner.*

PO-1050
(5/69)

UNITED STATES PATENT OFFICE
CERTIFICATE OF CORRECTION

Patent No. 3,439,792          Dated April 22, 1969

Inventor(s) Walter K. H. Frank and Ray B. Packer

It is certified that error appears in the above-identified patent and that said Letters Patent are hereby corrected as shown below:

Column 6, line 32 reading "rotation" should read -- rotational --. Column 8 lines 50-52 reading "a pivot line extending around the circumference of the circular neck portion," should be omitted.

SIGNED AND
SEALED

NOV 4 1969

(SEAL)
Attest:

Edward M. Fletcher, Jr.
Attesting Officer

WILLIAM E. SCHUYLER, JR.
Commissioner of Patents